United States Patent [19]
Imamura et al.

[11] Patent Number: 6,088,908
[45] Date of Patent: Jul. 18, 2000

[54] METHOD OF MAKING A HEAD SLIDER

[75] Inventors: Takahiro Imamura; Yukinori Ikegawa, both of Kawasaki, Japan

[73] Assignee: Fujitsu Limited, Kawasaki, Japan

[21] Appl. No.: 09/044,578

[22] Filed: Mar. 19, 1998

[30] Foreign Application Priority Data

Sep. 19, 1997 [JP] Japan .................................. 9-254712

[51] Int. Cl.$^7$ ...................................................... G11B 5/42
[52] U.S. Cl. ...................... 29/603.12; 264/220; 264/225; 360/103; 360/104
[58] Field of Search ........................ 29/603.12; 264/219, 264/220, 225; 360/103, 104

[56] References Cited

U.S. PATENT DOCUMENTS

| | | |
|---|---|---|
| 3,460,244 | 8/1969 | Metz . |
| 5,228,184 | 7/1993 | Kishi . |

FOREIGN PATENT DOCUMENTS

| | | |
|---|---|---|
| 0242597 | 10/1987 | European Pat. Off. . |
| 6113412 | 1/1986 | Japan . |
| 61-107514 | 5/1986 | Japan . |
| 63-18741 | 8/1988 | Japan . |
| 03292610 | 12/1991 | Japan . |
| 423215 | 1/1992 | Japan . |
| 0476809 | 3/1992 | Japan . |
| 4339306 | 11/1992 | Japan . |
| 06103597 | 4/1994 | Japan . |
| 62-75036 | 9/1994 | Japan . |
| 06295417 | 10/1994 | Japan . |
| 8235527 | 9/1996 | Japan . |

OTHER PUBLICATIONS

IBM Technical Disclosure Bulletin, vol. 36, No. 10, Oct. 1993; Patterned Substrate for Improved Slider Fabrication; pp. 409–410.

IBM Technical Disclosure Bulletin, vol. 36, No. 11, Nov. 1993; Device for Fast Access of Multiple Recording Tracks of Magnetic Disk Drives; pp. 155–156.

IEEE Transactions on Magnetics, vol. 25, p. 3190, 1989; "A New Thin Film Head Generation", J.P. Lazzari, P. Derou–Dauphin.

IEEE Transactions on Magnetics; vol. 25, p. 3686, 1989; "A New Approach To Making Think Film Head–Slider Devices", Daniel W. Chapman.

W. Henke, W. Hoppe, H.J. Quenzer, P. Staudt–Fischbach and B. Wagner; "Simulation and Experimental Study of gray–Tone Lithography for the Fabrication of Arbitrarily Shaped Surfaces", IEEE, Micro Electro Mechanical Systems, p. 205, 1994.

*Primary Examiner*—Carl E. Hall
*Attorney, Agent, or Firm*—Greer, Burns & Crain, Ltd.

[57] ABSTRACT

In a method for forming a horizontal head slider having a media opposing surface flying above or coming into contact with a recording medium, a film-like surface of a head for recording/reproducing information provided in parallel to the media opposing surface, and a rail portion provided on the media opposing surface for generating a pressure for ensuring stable flying or contact. The rail portion has a planar portion and a taper portion, and all of the shaping accuracy of the bottom surface of the slider and the rail, the adhesive property to a sacrificial layer overlaid thereon and the surface smoothness of the rail surface are enhanced. When the rail portion is formed, a part of mold for the planar portion is prepared by a metallic layer 2 and a mold for the taper portion is prepared by a photoresist layer 3, and a sacrificial layer 4, a media opposing surface layer 6 and a slider body layer 6 are formed thereon in this order.

4 Claims, 9 Drawing Sheets

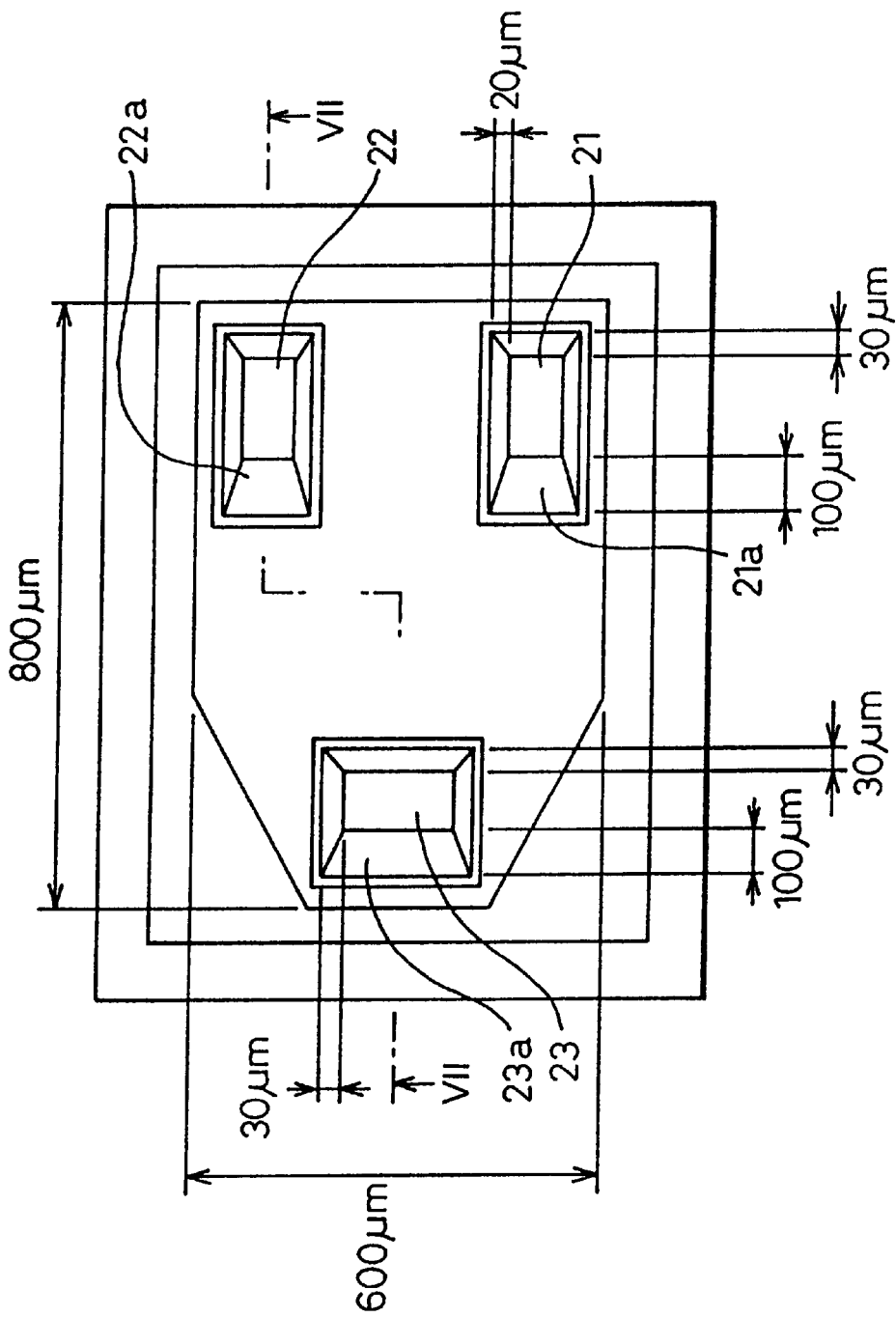

Fig.13
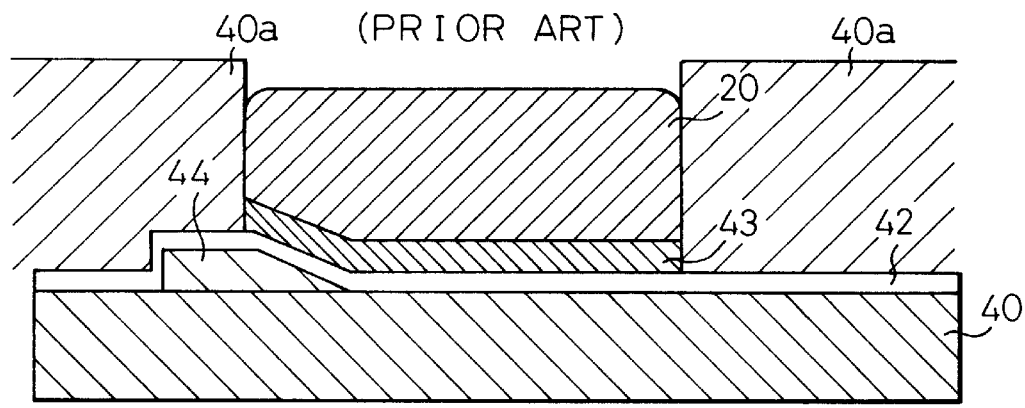
(PRIOR ART)
Fig.14(a)
(PRIOR ART)
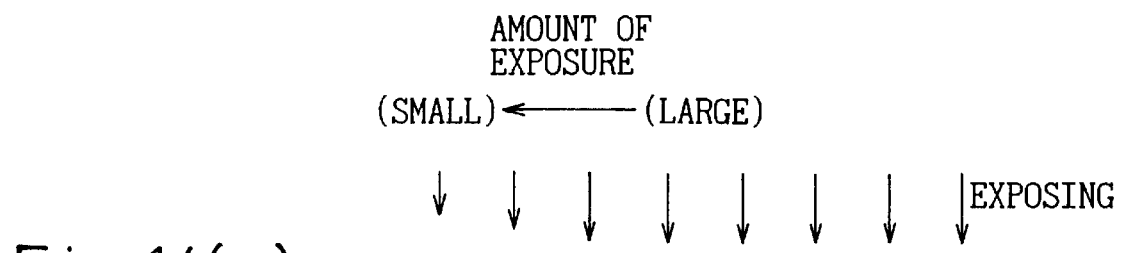
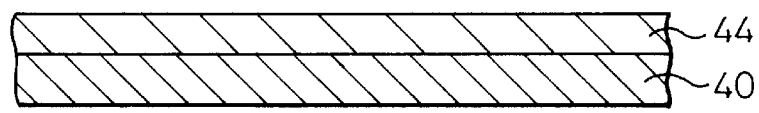
Fig.14(b)
(PRIOR ART)
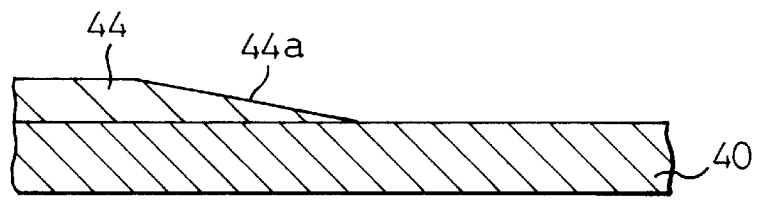

METHOD OF MAKING A HEAD SLIDER

BACKGROUND OF THE INVENTION

1. Field of the Invention

The present invention relates to a head slider for recording information onto a recording medium and reproducing the same therefrom in a magnetic disk device, an optical disk device, a photo-magnetic disk device or others, while flying above the recording medium or coming into contact therewith, and a method for producing the same, particularly to a method for forming a rail portion of the slider head wherein a head for recording and reproducing information is parallel to the surface of a confronting surface of the medium.

2. Description of the Related Art

As one means for reducing the production cost of an assembly of a head and a support spring, the inventors of the present invention have proposed a non-machine-processed slider, as disclosed in Japanese Unexamined Patent Publication No. 8-235527, which corresponds to a U.S. patent application Ser. No. 08/603,257, and therefor incorporate the contents thereof in this applications. According thereto, a proposed thin film magnetic head slider has an air bearing surface flying above a recording medium or coming into contact therewith where a thin film-forming surface of a thin film magnetic head element is parallel to the air bearing surface and is characterized in that a slider plate, made of a conductive material and having a rigidity, and at least one terminal pad, made of a conductive material, are arranged at a predetermined distance in the direction parallel to the air bearing surface.

Further, a proposed method, for forming such a thin film head slider comprises a process for forming the configuration of the air bearing surface on the substrate over a sacrificial layer or forming a sacrificial layer on a layer defining the configuration of the air bearing surface, a process for forming a flying rail made of an inorganic material on the sacrificial layer, a process for forming the slider plate and the terminal pad by a plating on the sacrificial layer, and a process for separating the slider plate from the substrate by etching the sacrificial layer.

More concretely, Japanese Unexamined Patent Publication No. 8-235527 proposes the following two methods for forming the rail portion as described below.

FIG. 9 illustrates a so-called guppy-shaped slider wherein a slider body 20 has a pair of right and left rails 21, 22 and a single central rail 23 provided on the air-entrance side as seen in the media opposing surface, each of which rails has a taper portion 21a, 22a or 23a, respectively, on the entrance side. A layer defining a mold for forming the respective rails is used for forming the slider as shown in FIG. 10. That is, the mold 30 has recesses 31, 32 for forming the right and left rails 21, 22 and a recess 33 for forming the central rail 23, as well as taper portions 31a, 32a and 33a corresponding to the taper portions 21a, 22a and 23a, respectively.

FIGS. 11 and 13 are cross-sectional views of a rail portion along a plane XI—XI in FIG. 10, formed by first and second conventional methods, respectively. FIGS. 12 and 14 illustrate the steps for forming the rail according to the first and second conventional methods, respectively.

According to the first conventional method, both of a planar portion and a taper portion in the rail are formed of a metallic layer. That is, in FIG. 11, reference numeral 20 denotes a slider body (Ni); 40 a substrate; 40a a part of mold consisting of resist; 41 a layer (Al) having a taper portion defining a part of mold for a rail; 42 a sacrificial layer (Al); and 43 a media opposing surface layer (SiO$_2$) opposed to a medium. In FIG. 12, the Al layer 41 is formed on the substrate 40 first, and a photoresist 44 is coated thereon and exposed from above. During the exposure, an area wherein the taper portion is formed is exposed while gradually decreasing the amount of light compared with the other area (see FIG. 12(a)). Then, the photoresist 44 is cured with heat or ultraviolet ray to form a taper portion 44a of the photoresist 44 (see FIG. 12(b)). Next, The Al layer 41 is etched by means of ion-milling, sputter-etching or another method (see FIG. 12(c)). The Al layer 41 is completely removed by the etching from an area in which no photoresist is left, but is left in the other area in which the photoresist 44 is still present, wherein an extent of etching varies in accordance with a residual amount of the photoresist 44. Thus, the taper portion 41a is formed in the Al layer 41 (see FIG. 12(d)).

In the above first method, the sacrificial layer 42 of Al (FIG. 11) is formed while using, as a mold, the substrate 40 on which the Al layer 41 having the taper portion 41a is formed in an area corresponding to the rail recess 31 (FIG. 10). Then, the media opposing surface layer (SiO$_2$) 43 is formed thereon and the slider body 20 is formed by means of nickel-plating or another method. In a post process, the sacrificial layer 42 is removed to result in the slider 20 provided with the rails 21, 22 and 23 (see FIG. 9).

According to the second method, both of a planar portion and a taper portion in the rail are formed of a photoresist. That is, in FIG. 13, reference numeral 20 denotes a slider body (Ni); 40 a substrate; 40a a part of mold consisting of resist; 42 a sacrificial layer (Al); and 43 a media opposing surface layer (SiO$_2$), and a photoresist layer 44 is formed as a layer having a taper portion used as a part of mold for rails. In FIG. 14, a photoresist 44 is coated on the substrate 40 and exposed from above. During the exposure, an area wherein the taper portion is formed is exposed while gradually decreasing an amount of light compared with the other area (see FIG. 14(a)). Then, the photoresist 44 is cured with heat or ultraviolet ray to form a taper portion (see FIG. 14(b)). This is used as a mold.

In such a manner, according to the second method, while using, as a mold, the substrate 40 carrying the photoresist layer having the taper portion 44a in an area corresponding to the rail recess 31 (FIG. 10), the sacrificial layer 42 of Al is formed thereon. Then, the media opposing surface layer (SiO$_2$) 43 is formed and the slider body 20 is formed thereon by means of nickel-plating or another method. In a post process, the sacrificial layer 42 is removed to result in the slider 20 provided with the rails 21, 22 and 23 (see FIG. 9).

The first method is advantageous in that the shaping accuracy of the rail is facilitated and the adhesive property to the sacrificial layer coated thereon is enhanced.

The second method is advantageous in that the surface roughness of the rail is minimized, since there is no need to use ion milling.

SUMMARY OF THE INVENTION

An object of the present invention is to provide a head slider having both the above-mentioned advantages obtained by the above two conventional methods and a method for producing the same, more concretely, to provide a head slider excellent in all of the shaping accuracy of the bottom surface and the rail of the slider, the adhesive property to the sacrificial layer coated just thereon and the surface smoothness of the rail surface, and a method for producing the same.

To achieve the above object, according to the present invention, there is provided a method for forming a horizontal head slider having a media opposing surface flying above or coming into contact with a recording medium, a film-like surface of a head element for recording/reproducing information provided in parallel with the media opposing surface, and a rail portion provided on the media opposing surface for generating a pressure for ensuring the stable flying or contact, wherein said rail portion has a planar portion and a taper portion; characterized in that, when the rail portion is formed, a bottom surface of mold for forming the planar portion is provided with a metallic layer and a bottom surface of a mold for forming the taper portion is provided with a photoresist layer, a sacrificial layer, a media opposing surface layer and a slider body layer are formed thereon in this order.

According to this method, the ion milling of the metallic layer can be eliminated, and thus the substrate surface is prevented from being roughened. Also, since the mold is mostly made of metal, the adhesive property thereof to the sacrificial layer formed just thereabove is enhanced. Since the volume of the photoresist used is minimized, the shaping accuracy is improved.

Preferably, the metallic layer for providing the bottom surface of the mold for the planar portion and the photoresist layer for providing the bottom surface of the mold for the taper portion overlap each other in the vicinity of the boundary thereof. In this case, after the metallic layer has been formed, the photoresist layer may be formed on the metallic layer to partially overlap therewith and to be cured with heat or ultraviolet light. Alternatively, the photoresist layer may be first formed, and after the photoresist layer has been cured with heat or ultraviolet light, the metallic layer is formed on the photoresist layer to be partially overlapped therewith.

Since the overlapped area is provided between the metallic layer and the photoresist layer, it is possible to increase the tolerance for positioning a photo mask when the photoresist layer is formed and thus improve the productivity.

The present invention also provides a head slider having a media opposing surface flying above or coming into contact with a recording medium, a thin film pattern surface of a head for recording/reproducing information provided in parallel with the media opposing surface, and a rail portion for generating a pressure for ensuring the stable flying or contact provided on the media opposing surface; said rail portion having a planar portion and a taper portion; characterized in that a recess is present between a base of the media opposing surface and a tapered portion of the rail portion.

BRIEF DESCRIPTION OF THE DRAWINGS

FIG. 6 is a plan view of a slider provided with taper portions not only on the air entrance side but also on the air exit side and the lateral sides of the rails, to which the present invention is applied;

FIG. 13 is a cross-sectional view of another conventional slider for illustrating the formation thereof; and FIGS. 14(a) and 14(b) illustrate the steps for forming the head slider shown in FIG. 13.

DETAILED DESCRIPTION OF THE PREFERRED EMBODIMENTS

The present invention will be described in more detail with reference to the preferred embodiments illustrated in the attached drawings.

Figure 1:
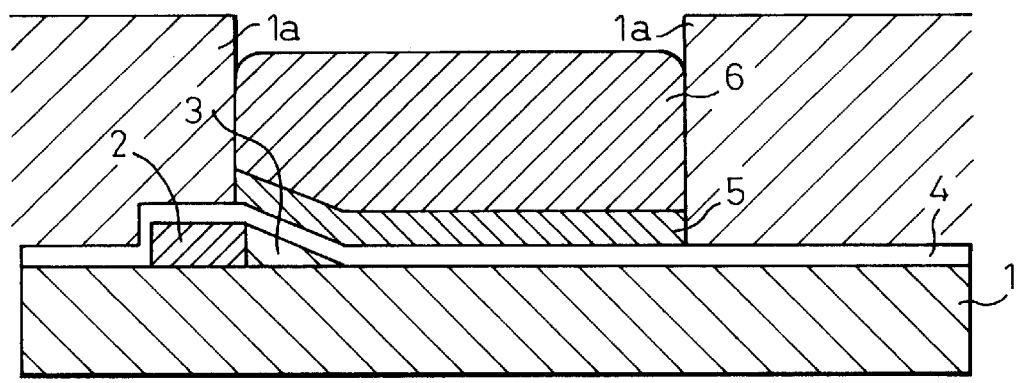
FIG. 1 is a cross-sectional view of a head slider for illustrating a method for producing the same according to a first embodiment of the present invention.

FIG. 1 illustrates a method for forming a head slider according to the present invention. A basic structure of this head slider is the same as that shown in FIG. 9; a guppy-shaped slider wherein a slider body has a pair of right and left rails and a central rail provided on the air entrance side thereof as seen in the media opposing surface. The respective rail has a taper portion on the air entrance side thereof. To form the slider, as shown in FIG. 10, a mold is used for shaping the respective rails. While corresponding to an air bearing surface of the head slider, this mold also has recesses for forming the right and left rails and a recess for forming the central rail as well as taper portions corresponding to the respective taper portion of the recesses.

FIG. 1 is a cross-sectional view of a concave rail portion taken along plane XI—XI in FIG. 10, and illustrates a method for forming a head slider according to a first embodiment of the present invention. In FIG. 1, reference numeral 1 denotes a substrate; 1a a part of mold consisting of a resist; 2 a metallic layer (Al) defining part of a mold for forming the planar portion of the rail; 3 a photoresist layer defining a mold for forming the taper portion of the rail; 4 a sacrificial layer (Al); 5 a media opposing surface layer ($SiO_2$); and 6 a slider body (Ni). In such a manner, according to the present invention, the layer for defining the mold for forming the respective rail is divided into two parts; the metallic (Al) layer 2 for the planar portion and the photoresist layer 3 for the taper portion. First, the mold for the planar portion is formed by chemically etching the metallic layer 2 with an acidic solution, and thereafter the photoresist is coated in the same manner as shown in FIG. 14, exposed with an adjusted amount of exposure light, and then is cured with heat or ultraviolet light to form the photoresist mold for the taper portion.

According to this method, since the ion milling of the metallic layer can be eliminated, the roughening of the substrate surface is avoidable. Also, since a major part of the mold is made of metal, the adhesive property of the mold to the sacrificial layer overlaid thereon is enhanced. Further, since the volume of the photoresist used is minimized, the shaping accuracy of the rail is also facilitated.

In this regard, the slider according to this embodiment is produced by providing a sacrificial layer 4 of Al on the mold thus obtained, forming a media opposing surface layer 5 of $SiO_2$ by a sputtering, and forming a slider body layer 6 by nickel plating. After the resultant slider is coupled to a head suspension (not shown) for supporting the slider, the sacrificial layer is removed by chemical etching using an alkaline solution such as KOH. Thus, the slider is separated from the substrate and used.

Figure 2:
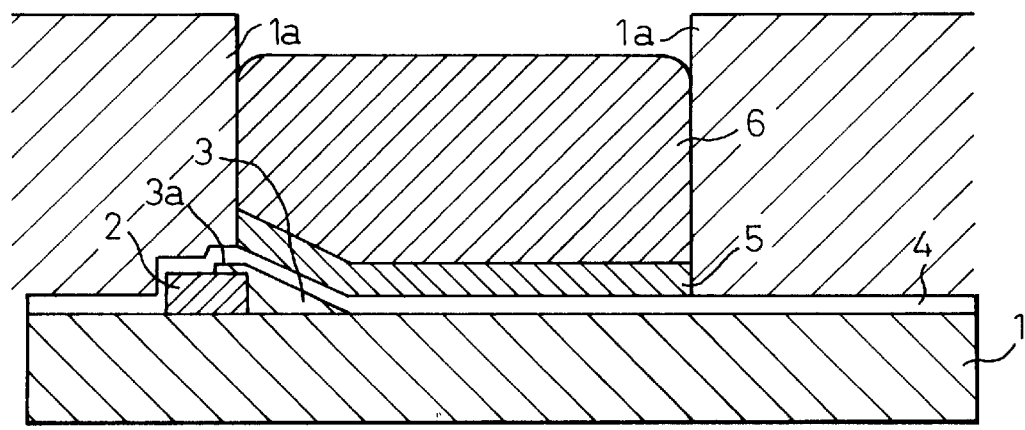
FIG. 2 is a cross-sectional view of a head slider for illustrating a method for producing the same according to a second embodiment of the present invention.
Figure 3A:
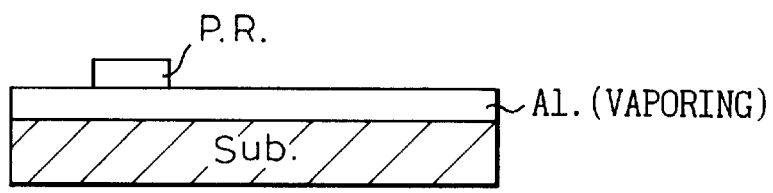
FIGS. 3(a) to 3(h) illustrate the steps for forming the head slider according to the second embodiment.
Figure 3B:
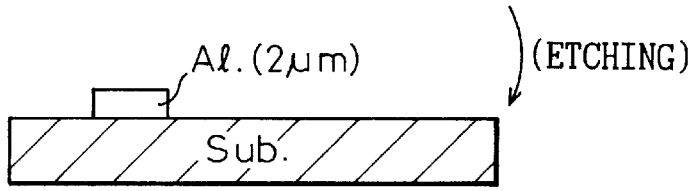
Figure 3C:
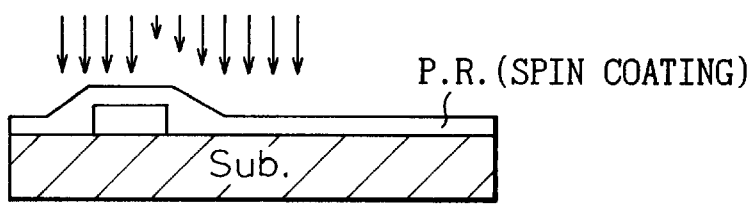
Figure 3D:
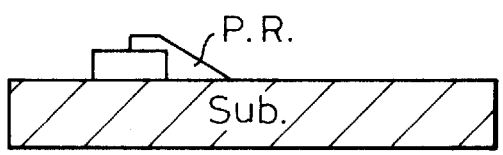
Figure 3E:
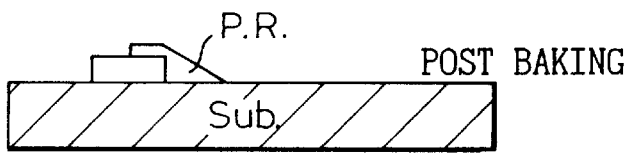
Figure 3F:
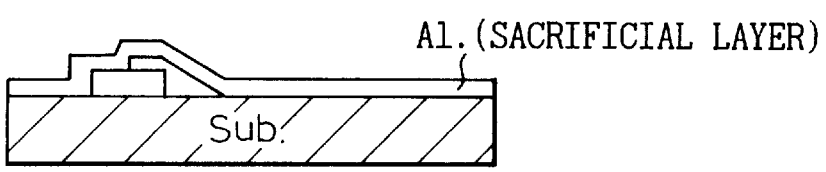
Figure 3G:
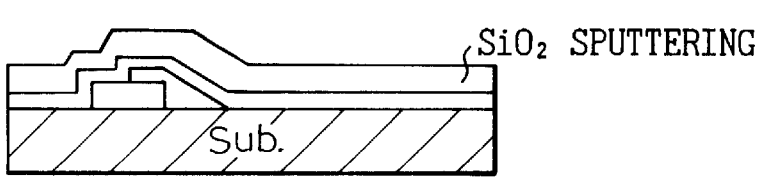
Figure 3H:
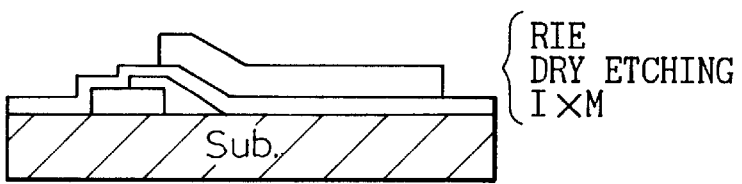

FIG. 2 illustrates a second embodiment of a method for forming a head slider according to the present invention. The difference between this embodiment and the embodiment shown in FIG. 1 is in that part of the photoresist is overlapped with the metallic layer. First, a metallic layer (Al) 2 defining a mold for forming a planar portion of a rail is formed by means of a chemical etching, and a photoresist layer 3 is coated on the metallic layer 2 to partly overlap therewith. Then, the photoresist layer 3 is exposed while adjusting an amount of exposure, and cured with heat or ultraviolet light to form a mold for forming a taper portion. By providing an overlapped area 3a of the metallic layer and the photoresist layer in such a manner, it is possible to increase a tolerance for positioning a photo mask (not shown) when the photoresist layer 3 is formed, whereby the productivity is improved. A shoulder in the overlapped area is fluidized when the photoresist is heated to the cured, and finally becomes shorter, resulting in a high accuracy rail.

FIG. 3 illustrates the steps for carrying out the method according to the second embodiment. In FIG. 3, an Al layer is formed on a substrate by vapor deposition or another method, and a photoresist is coated thereon (except for an area from which the Al layer is removed) (see FIG. 3(a)). After the Al layer has been removed by etching (FIG. 3(b)), a photoresist is coated all over the surface by spin coating and then exposed (FIG. 3(c)). During the exposure, the amount of exposure is gradually decreased in an area in which the taper portion is formed, compared with the other area (FIG. 3(d)). A taper portion is formed by curing the photoresist (PR) with heat or ultraviolet light (FIG. 3(e)). Next, an Al layer is formed by vapor deposition or another method (FIG. 3(f)), and a $SiO_2$ layer is formed by sputtering (FIG. 3(g)). Dry etching is applied to a required area (FIG. 3(h)) to form an air bearing surface layer, and nickel plating is applied thereon to form a slider body layer.

Figure 4:
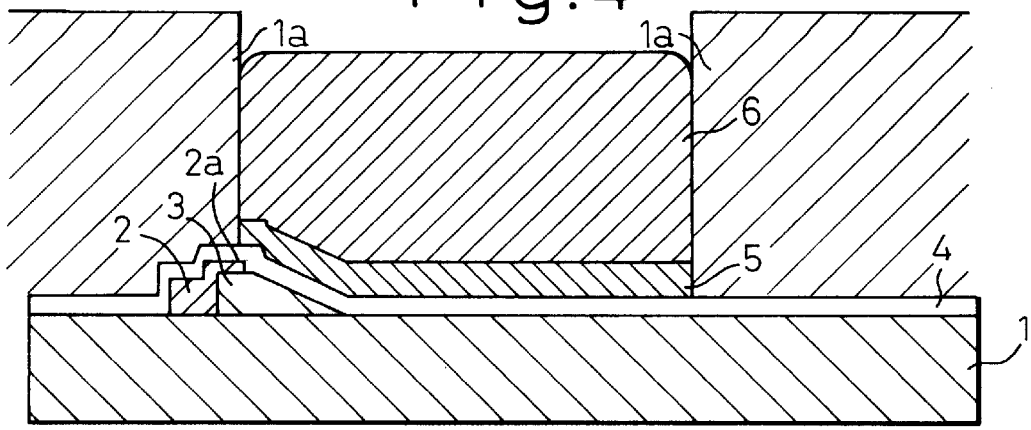
FIG. 4 is a cross-sectional view of a head slider for illustrating a method for producing the same according to a third embodiment of the present invention.
Figure 5A:
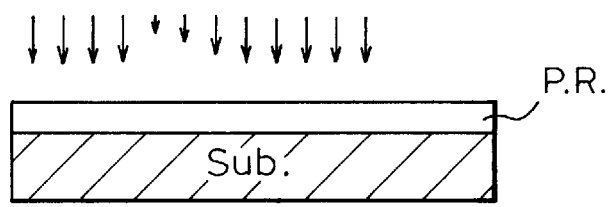
FIGS. 5(a) to 5(d) illustrate the steps for forming the head slider according to the third embodiment.
Figure 5B:
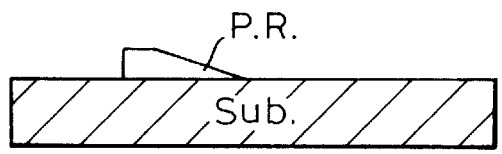
Figure 5C:
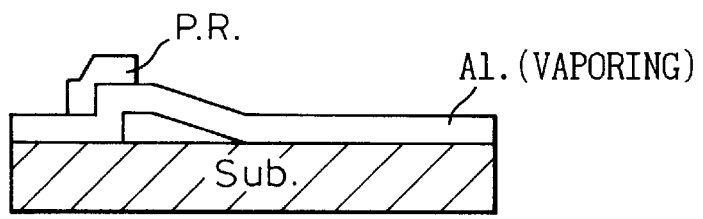
Figure 5D:
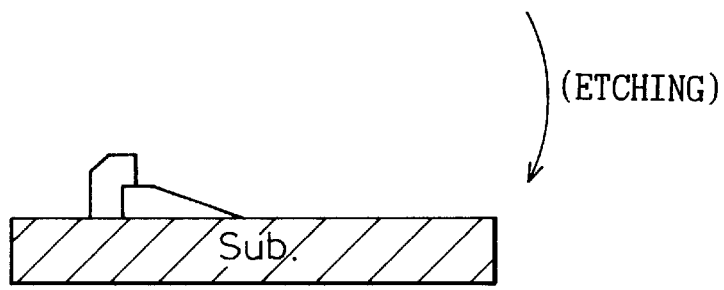

FIG. 4 illustrates a third embodiment of a method for forming a head slider according to the present invention. According to this embodiment, contrary to that shown in FIG. 2, a mold for a taper portion is first formed by exposing a photoresist layer 3 while adjusting an amount of exposure, and then the layer is cured with heat or ultraviolet light. Next, a mold for a planar portion of a rail is formed by chemical etching of a metallic layer 2 with an acidic solution. In the same manner as in the embodiment shown in FIG. 2, the photoresist layer 3 is overlapped with the metallic layer 2 to form an area 2a, whereby it is possible to increase a tolerance for positioning a photo mask (not shown) and thus improve the productivity. Since there is no coating other than the photoresist layer when the photoresist is cured in this embodiment, it is possible to apply a high temperature when the photoresist is cured with heat or ultraviolet light without regard to an effect of the temperature on any other coating, resulting in a chemically stable mold.

FIG. 5 illustrates the steps for carrying out the method according to the third embodiment. In FIG. 5, a photoresist (PR) layer is coated on a substrate (Sub) and exposed from above. During the exposure, an area for forming a taper portion is exposed while gradually decreasing the amount of exposure compared to that in the other area (FIG. 5(a)). The photoresist is cured with heat or ultraviolet light to form a taper portion (FIG. 5(b)). Then, an Al layer is formed by means of vapor deposition or another method, and the photoresist is coated thereon, except in an area from which the Al layer is removed, by means of a spin coating (FIG. 5(c)), and thereafter, the Al layer is removed by means of etching (FIG. 5(d)). Thus, a mold having a planar portion and a taper portion is completed.

Figure 7:
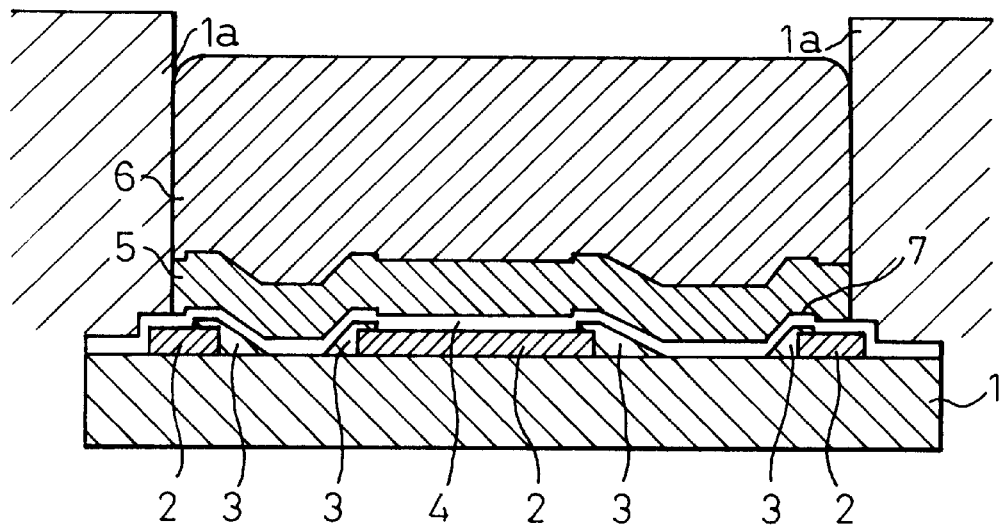
FIG. 7 is a cross-sectional view of a head slider for illustrating a method for producing the same according to a fourth embodiment of the present invention.
Figure 8:
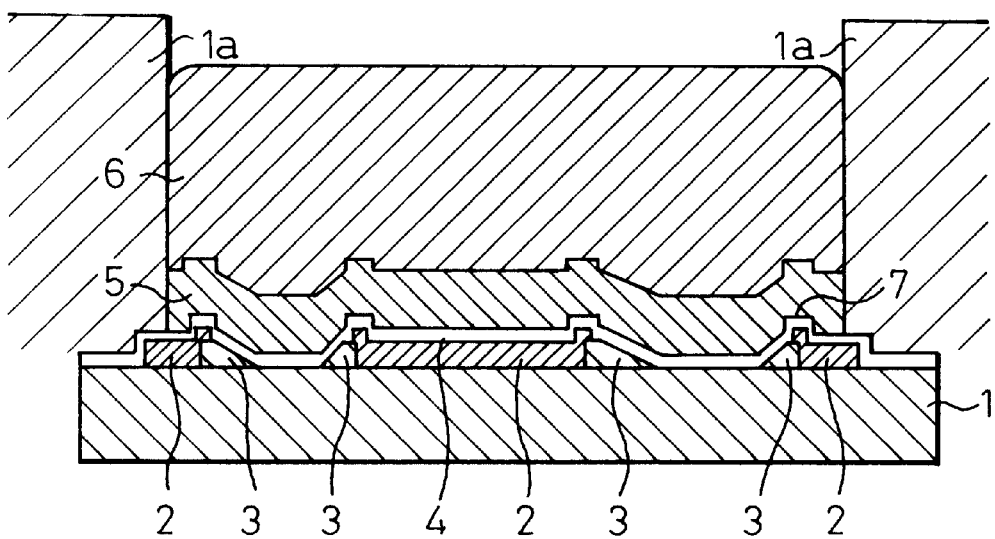
FIG. 8 is a side sectional view of a head slider for illustrating a method for producing the same according to a fifth embodiment of the present invention.
Figure 9:
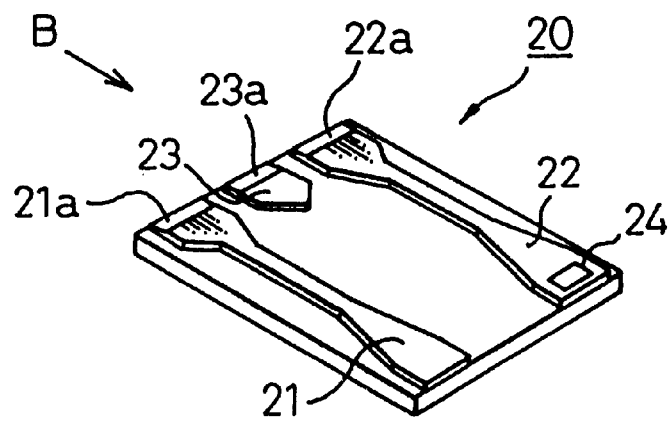
FIG. 9 is a diagrammatic perspective view of a conventional guppy-shaped slider.
Figure 10:
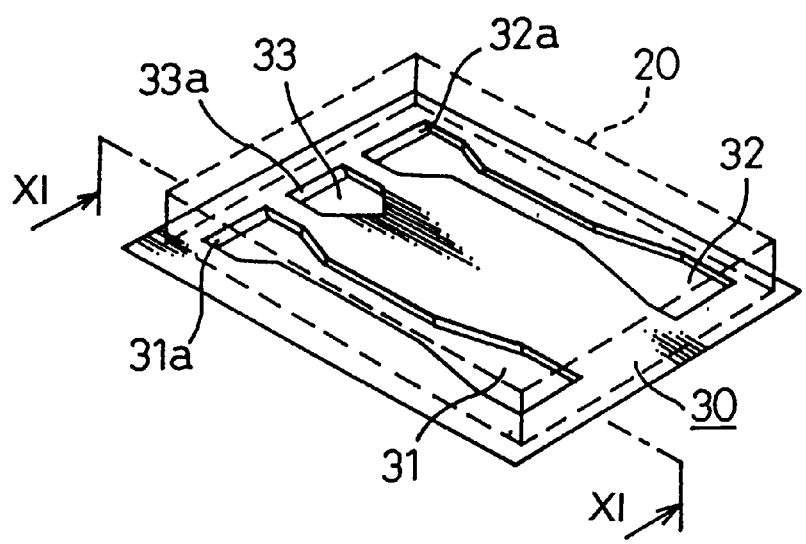
FIG. 10 is a perspective view of a mold for forming the conventional slider.
Figure 11:
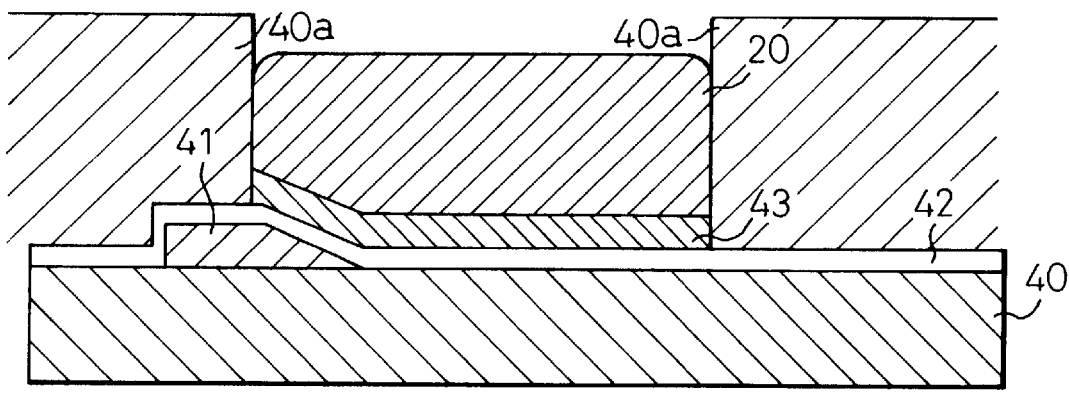
FIG. 11 is a cross-sectional view of a conventional slider for illustrating the formation thereof.
Figure 12A:
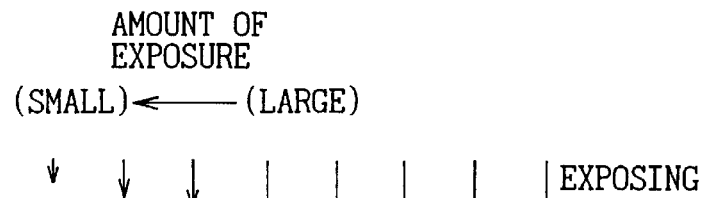
FIGS. 12(a) to 12(d) illustrate the steps for forming the head slider shown in FIG. 11.
Figure 12B:
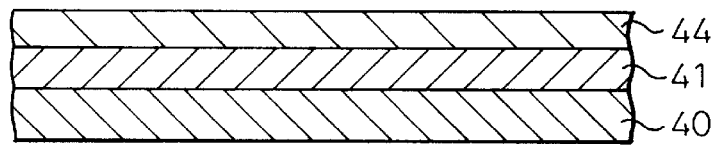
Figure 12C:
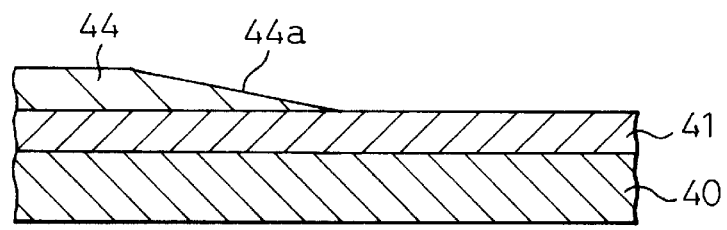
Figure 12D:
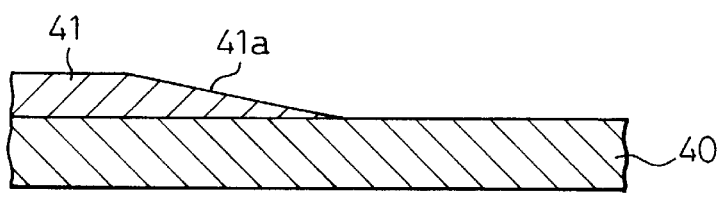

FIG. 6 illustrates a slider provided with taper portions 21a, 22a and 23a not only on the air entrance side of rails 21, 22 and 23 as seen in the media opposing surface but also on the air exit side as well as lateral sides according to the present invention (In this regard, this slider is not a parallel rail type as shown in FIG. 9 but a three point rail type). FIG. 7 is a cross-sectional view along a plane VII—VII in FIG. 6 wherein layers forming a mold are formed in the order of a metallic layer 2 and a photoresist layer 3, and FIG. 8 is a cross-sectional view along a plane VII—VII in FIG. 6 wherein layers forming a mold are formed in the order of a photoresist layer 3 and a metallic layer 2.

In the same manner as described with reference to the preceding embodiment, a slider is formed by forming a sacrificial layer (Al) on a rail mold having a planar portion and a taper portion, then forming a media opposing surface layer S by means of sputtering, and further providing a slider body layer 6 by means of nickel plating.

An example of the dimensions of the slider, the rails and the taper portion thereof according to this embodiment is shown in FIG. 6. In this regard, a height of the rail is 2 $\mu$m in the embodiment shown in FIG. 6. According to the slider of a parallel rail type shown in FIGS. 1, 2 and 4, a height of the rail is 2 $\mu$m and a length of the taper portion is 50 $\mu$m.

These embodiments have the same effect as that obtained from the second and third embodiment. While recess 7 (as seen from the media opposing surface layer 5) is created corresponding to the overlapping of the metallic layer 2 with the photoresist layer 3 forming the mold, there is no adverse effect therefrom on the characteristic of the slider because the distance between the recess 7 and the recording medium (not shown) is larger than a minute distance between the protruded portion of the rail and the recording medium.

While the present invention has been described in detail above with reference to the preferred embodiments illustrated in the attached drawings, it should be noted that the present invention is not limited to the above embodiments but may include various modifications and changes thereof without departing from the spirit and a scope of the invention.

As described above, according to the present invention, it is possible to enhance a shaping accuracy of a rail of a horizontal head slider, an adhesive property of a rail mold layer to a sacrificial layer, and the surface smoothness of the rail.

We claim:

1. A method for forming a horizontal head slider, the head slider having a media opposing surface layer and a slider body layer, said media opposing surface layer flying above or coming into contact with a recording medium, thin film magnetic head element for recording/reproducing information provided in parallel with the media opposing surface, and at least one rail for generating a pressure for ensuring stable flying or contact, wherein the rail has a planar portion and a taper portion; comprising the steps of:

making a mold having a substrate as its bottom surface;

providing a metallic layer which forms a first portion of said mold corresponding to said planar portion of said rail;

providing a photoresist layer which forms a second portion of said mold corresponding to said taper portion of said rail;

forming the media opposing surface layer, followed by forming the slider body layer, in this order over the metallic mold layer and the photoresist mold layer.

2. The method for forming a head slider as defined by claim 1, comprising the step of overlapping, at least partially, said metallic layer and said photoresist layer with each other in the vicinity of a boundary thereof.

3. The method for forming a head slider as defined by claim 2, wherein said metallic layer at least partially overlaps said photoresist layer beneath said photoresist layer, and said photoresist layer is cured with heat or ultraviolet light.

4. The method for forming a head slider as defined by claim 2, wherein said photoresist layer is cured with heat or ultraviolet light, and said metallic layer at least partially overlaps said cured photoresist layer over said photoresist layer.

* * * * *

UNITED STATES PATENT AND TRADEMARK OFFICE
CERTIFICATE OF CORRECTION

PATENT NO. : 6,088,908  
DATED : July 18, 2000  
INVENTOR(S) : Imamura et al.

Page 1 of 1

It is certified that error appears in the above-identified patent and that said Letters Patent is hereby corrected as shown below:

Title page,  
Item [56], "References Cited FOREIGN PATENT DOCUMENTS"  
Line 4, please delete "63-18741" and insert -- 63-187411 -- therefor Item "[57], ABSTRACT",  
Line 15, delete "6" and insert -- 5 -- therefor Signed and Sealed this Twenty-fifth Day of December, 2001

Attest:

JAMES E. ROGAN  
*Attesting Officer*  *Director of the United States Patent and Trademark Office*